(No Model.)

W. A. CROWDUS.
GALVANIC BATTERY.

No. 445,425. Patented Jan. 27, 1891.

WITNESSES:
John Becher
Fred White

INVENTOR:
Walter Ambus Crowdus,
By his Attorneys,
Arthur C. Fraser & Co.

THE NORRIS PETERS CO., PHOTO-LITHO., WASHINGTON, D. C.

UNITED STATES PATENT OFFICE.

WALTER AMBUS CROWDUS, OF MEMPHIS, TENNESSEE, ASSIGNOR TO JO. W. ALLISON, TRUSTEE, OF SAME PLACE.

GALVANIC BATTERY.

SPECIFICATION forming part of Letters Patent No. 445,425, dated January 27, 1891.

Application filed October 7, 1890. Serial No. 367,340. (No model.)

*To all whom it may concern:*

Be it known that I, WALTER AMBUS CROWDUS, a citizen of the United States, residing at Memphis, in the State of Tennessee, have invented certain new and useful Improvements in Electric Batteries, of which the following is a specification.

This invention relates to two-fluid batteries, or those in which a porous diaphragm or partition is used. Such batteries are subject to the disadvantages of the mixing of the two solutions by osmotic action through the porous diaphragm and of the high internal resistance due to the intervention of the porous diaphragm, which is not in itself a conductor of electricity.

The object of my invention is to reduce to a minimum the internal resistance of such batteries without increasing the osmotic effect, as would result from an effort to reduce the internal resistance by making the porous diaphragm thinner or of greater porosity.

To this end my invention consists in constructing the carbon negative plate of the battery to constitute a portion of the porous partition or diaphragm separating the two solutions. The remainder of the porous diaphragm consists of a plate of unglazed earthenware, such as is commonly used in batteries; but this plate is made very much thinner than heretofore, thereby reducing its electrical resistance. The carbon plate is placed against and held to the earthenware plate, so that it contributes in co-operation therewith to maintain the separation of the two liquids. The osmotic action is thus equally well or in the case of a carbon plate of sufficient thickness is even more effectually prevented than by the use of a simple earthenware partition, as heretofore. At the same time the internal resistance is greatly reduced, since only a portion of the thickness of the porous plate consists of non-conducting earthenware, the remaining portion being made up of the electrically-conducting carbon.

Figure 1:
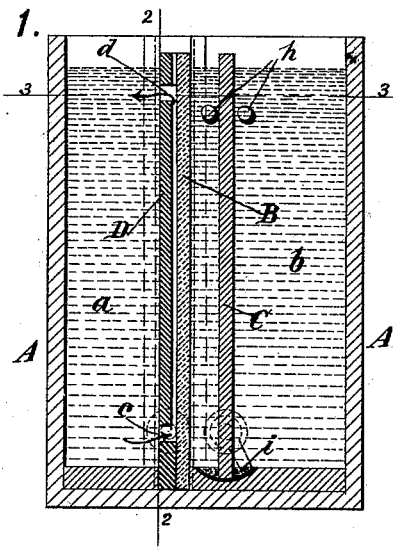
Figure 2:
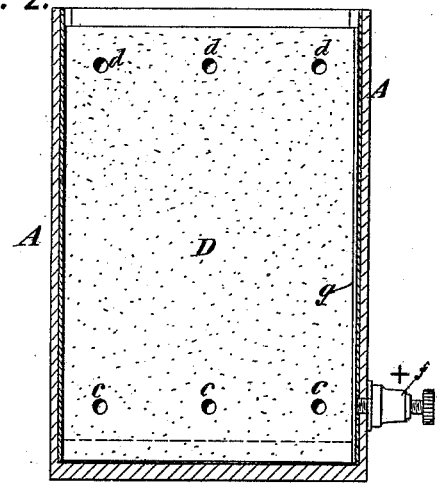
Figure 3:
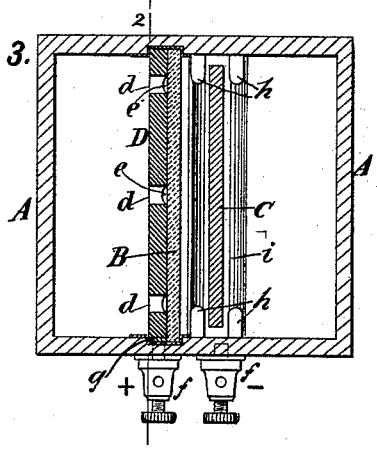
Figure 4:
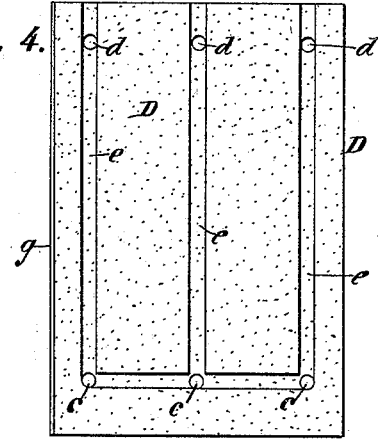
Figure 6:
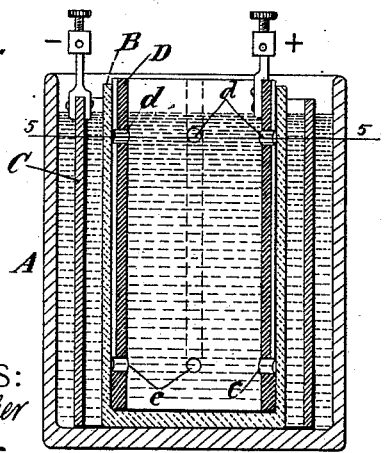
Figure 5:
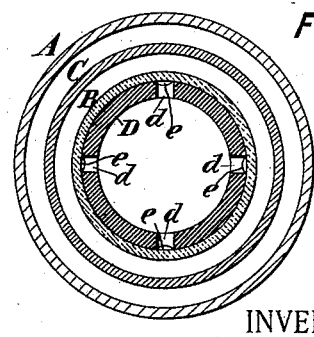

Figure 1 of the accompanying drawings is a vertical transverse section of a battery constructed according to my invention, the battery-jar being divided into two compartments by a flat porous partition. Fig. 2 is a vertical section in a plane at right angles to Fig. 1, as denoted by the line 2 2. Fig. 3 is a plan thereof. Fig. 4 is a side view of the carbon plate removed. Figs. 5 and 6 are respectively a plan and vertical mid-section of a modified form of battery, wherein the porous partition is in the form of a cylindrical cup.

I will first describe the construction shown in Figs. 1 to 4, inclusive. The jar or vessel A, which may be made of any suitable material—such as of wood permeated with wax, for example—is divided by a porous partition B into two compartments $a$ and $b$, respectively, the former of which contains the electrolyte for the negative plate and the latter that for the positive plate. The zinc or other positive plate C is placed in the compartment $b$, preferably close to the partition B. The negative plate consists of a plate of carbon D, placed against the partition B, which latter is made of porous or unglazed earthenware. The plate D may be made of any suitable porous carbon. It co-operates with the earthenware plate B in performing the function of a porous diaphragm for separating the electrolytic solutions, thus enabling the thickness of the earthenware plate B to be greatly reduced—say, for example, to one-half its ordinary thickness—whereby the internal resistance of the battery is proportionally lowered. The resistance of the earthenware plate B, reduced by the electrolyte in its interstices, consitutes, practically, the sole internal resistance of the battery, aside from the inevitable resistance of the electrolyte. The resistance of the carbon plate D, with its contained electrolyte, which is very low, is practically inappreciable, since the electrolytic action occurs on the surface and within the interstices of the carbon plate, so that the electric current is not compelled to traverse the entire thickness of this plate.

The extent to which the mixing of the electrolytic solutions occurs is dependent upon the density of the carbon plate, (assuming the earthenware plate to be of uniform density.) Hence by making the carbon plate sufficiently dense I can reduce the osmotic action to any desired extent. I prefer to use dense and hard carbon, instead of soft and porous carbon, and to increase the osmotic action to any extent desired by providing the carbon plate with one or more small holes, of such number and size as shall be suitable for the purpose, and that surface of the carbon which is next to and in contact with the earthenware plate I form with shallow channels or grooves, in order to expose between the plates a thin stream of the negative electrolyte. This stream is caused to circulate upwardly by the electrolytic action, thereby keeping the negative electrolyte in circulation. The negative electrolyte thus introduced between the plates B and D reduces the internal resistance of the battery and serves to check the osmotic mixing of the positive and negative electrolytes, when the battery is open-circuited, by constituting a third and partially neutral division. The perforations at the bottom and top are designated by $c\,d$ in Figs. 1 and 4, and the grooves or channels by $e\,e$ in Figs. 4 and 3. The channels $e\,e$ serve, also, to carry out at the top any disengaged gas, removing it from the portion of the negative electrolyte which is inactive, since the depolarization takes place only on that side of the carbon plate which is against the earthenware plate.

I do not limit myself to the construction of the carbon plate with perforations and channels, as this construction is not essential to my invention. A dense carbon without perforations is best adapted to a battery designed to remain open-circuited for long periods. The greater the work the battery has to do the freer must be the circulation through the carbon plate, and hence for a closed-circuit battery to give an active output the carbon plate, if it is not sufficiently porous, should be perforated or otherwise treated, in order to increase the circulation to the proper extent to produce the desired effect.

The terminal connections, with their respective plates or electrodes, may be made in any known or suitable manner. The connections shown consist of binding-posts $f\,f$, applied to one side of the jar and communicating through the side wall thereof with their respective plates. One edge of the carbon plate may be electroplated with copper, as shown at $g$, and the positive binding-post screwed directly into contact therewith or otherwise connected thereto. I have shown the positive electrode or zinc plate C supported at its top by pegs $h\,h$ and resting at its bottom in a trough $i$, containing mercury. This trough, if made of metal, may be formed with a portion extending through the wall of the jar and connecting with the negative binding-post.

The connection of the positive electrode to its binding-post through the medium of a bath of mercury is not herein claimed, being made the subject of a separate application, Serial No. 347,421, filed October 8, 1890.

Figs. 5 and 6 show a construction suitable for small batteries, wherein a cylindrical jar A is used, within which is placed a curved sheet of zinc C, and within this a porous cup B of earthenware, but thinner than the usual porous cup, and having a cylinder or carbon D fitted within it and constituting the negative electrode. This carbon cylinder may be perforated, as shown at $c\,d$ in Fig. 6, and may be formed on its outer side with grooves, as shown at $e\,e$ in Fig. 5.

I am aware that carbon alone has been used as a porous cup in single-fluid batteries, having a solid depolarizer within it, as in chloride-of-ammonia batteries. Attempts have also been made to use a carbon porous cup in two fluid-batteries. I make no claim to such construction. That which is characteristic of my battery is the use of a porous carbon diaphragm, combined and co-operating with an earthenware or non-conducting porous partition, joined together in any suitable manner. The actual contact of the two plates at all points is not essential. My invention is also characterized by the use of means for changing the circulation through and between the porous mediums.

In lieu of forming grooves or channels on the side of the carbon next the earthenware plate, the two plates may be slightly separated to leave room for the circulation of a thin film of the liquid between them.

I claim as my invention the following-defined novel features or improvements, substantially as hereinbefore specified, namely:

1. In an electric battery, the combination, with a battery-jar and a non-conducting porous partition dividing it into two chambers for the respective electrolytes, of a conducting porous partition arranged against and co-operating with the non-conducting partition, whereby the thickness and resistance of the latter may be reduced without increasing the osmotic mixing of the electrolytes.

2. In an electric battery, the combination, with a battery-jar and a non-conducting porous partition dividing it into two chambers for the respective electrolytes, of a positive electrode in one of said chambers and a negative electrode in the other, consisting of a conducting porous partition arranged against and co-operating with the non-conducting partition in separating the electrolytes.

3. In a two-fluid battery, the porous partition consisting of a plate of porous non-conducting material and a plate of porous carbon, arranged together to co-operate in separating the electrolytes.

4. In an electric battery, the combination, with a battery-jar and a non-conducting porous partition dividing it into two chambers for the respective electrolytes, of a positive electrode in one of said chambers and a negative electrode in the other, consisting of a plate of porous carbon arranged against and co-operating with the non-conducting partition, and provided with chambers or passages additional to its porous interstices for admitting the electrolyte in a predetermined volume through the carbon and into contact with the non-conducting plate, whereby the electrolytic circulation may be increased to any desired extent beyond the capacity of the natural porosity of the carbon.

5. In a two-fluid battery, the porous partition consisting of a plate of porous non-conducting material and a plate of porous carbon arranged against it, and formed to admit a circulation of a thin stream or film of the electrolyte between it and the non-conducting plate.

6. In a two-fluid battery, the porous partition consisting of a plate of porous non-conducting material and a plate of porous carbon arranged against it, having perforations through it and grooves or chambers on its side next the non-conducting plate to admit a circulation of the electrolyte between them.

7. In a two-fluid battery, the porous partition consisting of a plate of porous non-conducting material, and a negative electrode consisting of a plate of porous carbon arranged against it and formed to admit a stream or film of the electrolyte to circulate between it and the non-conducting plate.

In witness whereof I have hereunto signed my name in the presence of two subscribing witnesses.

WALTER AMBUS CROWDUS.

Witnesses:
O. S. FOWLER,
J. L. HUDGINS.